US008312030B2

(12) United States Patent
Liu et al.

(10) Patent No.: US 8,312,030 B2
(45) Date of Patent: Nov. 13, 2012

(54) EFFICIENT EVALUATION OF XQUERY AND XPATH FULL TEXT EXTENSION

(75) Inventors: Zhen Hua Liu, San Mateo, CA (US);
Thomas Baby, Maple Valley, WA (US);
Sukhendu Chakraborty, San Francisco, CA (US); Anguel Novoselsky, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 675 days.

(21) Appl. No.: 12/388,249

(22) Filed: Feb. 18, 2009

(65) Prior Publication Data

US 2010/0211560 A1  Aug. 19, 2010

(51) Int. Cl.
G06F 17/30 (2006.01)
G06F 7/00 (2006.01)
(52) U.S. Cl. ........................................ 707/756; 707/755
(58) Field of Classification Search .................. 707/756, 707/755
See application file for complete search history.

(56) References Cited

U.S. PATENT DOCUMENTS

| 2006/0036644 | A1* | 2/2006 | Cheslow | 707/104.1 |
| 2009/0271790 | A1* | 10/2009 | Williams | 718/100 |

OTHER PUBLICATIONS

Amer-Yahia, TeXQuery: A Full-Text Search Extension to XQuery, WWW 2004, pp. 1-12.*
"XQuery and XPath Full Text 1.0" downloaded from the Internet Jun. 23, 2009 < http://www.w3.org/TR/xquery-full-text/ > pp. 1-92.

* cited by examiner

Primary Examiner — Kuen Lu
(74) Attorney, Agent, or Firm — Hickman Palermo Truong Becker Bingham Wong LLP; Daniel D. Ledesma (57) ABSTRACT

Techniques are provided for efficiently evaluating XML queries that conform to an extension of an XML language (e.g., XQuery or XPath). The extension allows XML queries to have full-text search capabilities. Such an XML query is compiled to generate a tree of nodes that correspond to one or more conditions in the full-text portion of the query. In one technique, the amount of memory for the execution state of the tree is determined at compile time and allocated only once throughout execution of the query. In another technique, to ensure at most a single scan of a document, all the words or phrases in the full-text portion of an XML query are located before any of the other conditions in the full-text portion are evaluated. In another technique, the elements of the full-text portion of an XML query are analyzed to determine, based at least in part on cost, which evaluation strategy, of a plurality of evaluation strategies, should be employed.

24 Claims, 3 Drawing Sheets

FIG. 3

EFFICIENT EVALUATION OF XQUERY AND XPATH FULL TEXT EXTENSION

FIELD OF THE INVENTION

The present invention relates to processing XQuery queries in a database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Extensible Markup Language (XML) is a standard for data and documents that has wide acceptance in the computer industry. Relational and object-relational database systems are configured to store and support query mechanisms for XML data. It is important for such database systems to be able to execute SQL queries that embed XML query languages, such as XQuery.

XQuery is a query language that is designed to query collections of XML data and is semantically similar to SQL. XQuery 1.0 was developed by the XML Query working group of the W3C. The work was closely coordinated with the development of XSLT 2.0 by the XSL Working Group; the two groups shared responsibility for XPath 2.0, which is a subset of XQuery 1.0. The specification that defines XQuery 1.0 became a W3C Recommendation on Jan. 23, 2007. This specification is available at http://www.w3.org/TR/xquery/ and is incorporated by reference as if fully set forth herein.

XQuery provides the means to extract and manipulate data from XML documents or any data source that can be viewed as XML, such as relational databases or office documents.

XQuery uses XPath expression syntax to address specific parts of an XML document and supplements XPath expression syntax with a SQL-like "FLWOR expression" for performing joins. A FLWOR expression is constructed from the five clauses after which the FLWOR expression is named: for, let, where, order by, return.

XQuery is based on a tree-structured model of the information content of an XML document, containing seven kinds of nodes: document nodes, elements, attributes, text nodes, comments, processing instructions, and namespaces.

XQuery's type system models all values as sequences (a singleton value is considered to be a sequence of length one). An item in a sequence can either be a node or an atomic value. Atomic values may be integers, strings, booleans, etc.

Full-Text Search of XML

XQuery 1.0 originally lacked full text search capability. However, the "XQuery and XPath Full Text 1.0" (referred to herein as "XQuery FT") specification became a W3C Recommendation on May 16, 2008. The specification is available at http://www.w3.org/TR/xquery-full-text/ and is incorporated by reference as if fully set forth herein. XQuery FT is a query language that extends XQuery 1.0 and XPath 2.0 with full text search capabilities.

The specification defines the extension of XQuery 1.0 and XPath 2.0 with an FTContains expression that enables full text search capability for XML. The specification also defines the formal semantics of the FTContains expression using XQuery and/or XPath as the definitional language. With full text extension to XQuery and XPath, users are able to take advantage of full text search in XML documents along with path expressions and FLWOR expressions. In all, XQuery FT is a powerful language to query content of XML using 'Google'-like text search functionalities.

Full-Text XML Queries

An XML FT query (whether XQuery-based or XPath-based) includes an FTContains expression. An FTContains expression includes a search context, an FTContains operator, and an FTSelection expression. The FTSelection expression (or "FTSelection" for short) specifies one or more conditions of a full-text search. During compilation of an XML FT query, an FTSelection tree is generated based on the FTSelection. Each node in the FTSelection tree corresponds to an FT operator, such as FTWords, FTAnd, FTOr, FTTimes, and FTWindow. The FTWords operator corresponds to a token or phrase specified in the original XML FT query. The FTWords operator is generally a leaf node in an FTSelection tree.

As indicated in the XQuery FT specification, a "token" is a non-empty sequence of characters returned by a tokenizer as a basic unit to be searched. A "phrase" is an ordered sequence of any number of tokens.

An evaluation of an FTContains expression comprises evaluating a sequence of items (from the search context) against the FTSelection and returning a Boolean value (i.e., TRUE or FALSE). If an FTContains expression returns true, then there is some item in the search context that satisfies a result of the FTSelection tree. The following example XQuery FT query returns the author of each book with a title containing a token with the same root as 'dog' and the token 'cat.' for $b in /books/book
    where $b/title ftcontains ('dog' with stemming) ftand 'cat'
    return $b/author The following example XPath FT query returns the same result as the above query:

/books/book[title ftcontains ('dog' with stemming) ftand 'cat']/author In the above examples, "books/book/title" is the search context, "('dog' with stemming) ftand 'cat'" is the FTSelection, and "ftand" is an FT operator in the FTSelection.

The results of the evaluation of an FTSelection tree are instances of the AllMatches model, which complements the XQuery Data Model (XDM) for processing full-text queries. An AllMatches object describes the possible results of an FTSelection and contains zero or more Matches. A Match describes one result to an FTSelection. The result is described in terms of zero or more StringMatches. A StringMatch is a possible match of a sequence of one or more query tokens with a corresponding sequence of tokens in a document. A StringMatch may be a StringInclude or a StringExclude. The resulting AllMatches object obtained by the evaluation of an FTContains expression is converted into a Boolean value before being returned to the enclosing XQuery or XPath operation.

According to the XQuery FT specification, when evaluating an FTContains expression, the search context is evaluated first to generate a sequence of search context items. Later, for each search context item, the item is tokenized to generate one or more tokens. The FTSelection tree is evaluated against the one or more tokens. The XQuery FT specification clearly defines this evaluation logic and other the semantics of the XQuery full-text extension. However, the XQuery FT specification fails to provide an efficient evaluation strategy of queries that include the full-text extension. From a performance perspective, using an XQuery engine to execute the XQuery FT code that is used to define the semantics of the XQuery full-text extension is not an acceptable solution.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Multiple techniques are described herein for efficiently evaluating XML FT queries. In one technique, the materializing of all Match instances is avoided during the evaluation of an FTSelection tree using an iterator type of approach. In another technique, memory for the execution state of the FTSelection tree for each thread is allocated at compile time, which avoids dynamic memory allocation as much as possible. In another technique, to ensure at most a single scan of a document, all the words or phrases in the full-text portion of an XML query are located before any of the other conditions in the full-text portion are evaluated. In another technique, the FTContains expression evaluation is integrated with the rest of an XQuery expression using one of multiple evaluation strategies based on cost.

In an embodiment, an FTSelection tree is designed to be sharable among concurrent processing threads. In a database environment, multiple users may run the same XML FT query, which means that the processing threads of the multiple users may execute the same FTSelection tree. An FTSelection tree becomes sharable among concurrent processing threads by separating the read-only content associated with the FTSelection tree from the read-write content associated with the FTSelection tree and sharing the read-only content with multiple concurrent processing threads. The read-only content includes the FTSelection tree itself while the read-write content includes the execution state for each processing thread.

Iterator Evaluation Model of FTSelection Tree

As noted previously, FTContains returns TRUE or FALSE indicating whether the search context includes an item that satisfies the FTSelection portion of the corresponding query. The semantics of the XQuery FT specification defines an eager evaluation model where all matching records are materialized before determining whether to return TRUE or FALSE. For example, the query:

/books/book[title ftcontains 'dog' ftand 'cat']/author returns the author of each book with a title containing the token "dog" and the token "cat." In evaluating the FTContains expression, the eager evaluation model would retrieve all title element nodes and, for each title element node, evaluate the FTSelection. Evaluating the FTSelection entails, for each title element node: (1) materialize all possible StringMatches for the token "dog"; (2) materialize all possible StringMatches for the token "cat"; and (3) perform a Cartesian product of the results of (1) and (2). "Materializing" a match instance (whether a Match or a StringMatch) refers to determining a result of an operator and storing a record (e.g., "Match record") that identifies the result. For example, materializing a result of an FTWords operator comprises identifying, within a document, a location of a token, associated with the FTWords operator, and storing (e.g., in a StringMatch record) information indicating the document and the location.

However, in an embodiment of the invention, all possible StringMatch records are not materialized before determining to return TRUE or FALSE. Instead, an FTSelection tree is evaluated using an iterator evaluation model. When applying the iterator evaluation model to an FTSelection tree, the general principle is that the materialization of the AllMatches data model used by XQuery FT is delayed as much as possible. An AllMatches result may consist of a large collection of Match records if the eager evaluation model is used. The iterator evaluation model avoids materializing all possible Match records at the leaf level of an FTSelection tree before the parent operators in the FTSelection tree are evaluated. In other words, once a Match record at a leaf node in the FTSelection tree is generated the parent node of that leaf node is evaluated. Thus, each Match record is computed a chunk at a time by each call of a getNext( ) method. Once a match is found at a particular node in the FTSelection tree, the corresponding Match record is propagated "up" the FTSelection tree to a parent node of that particular node.

Figure 1:
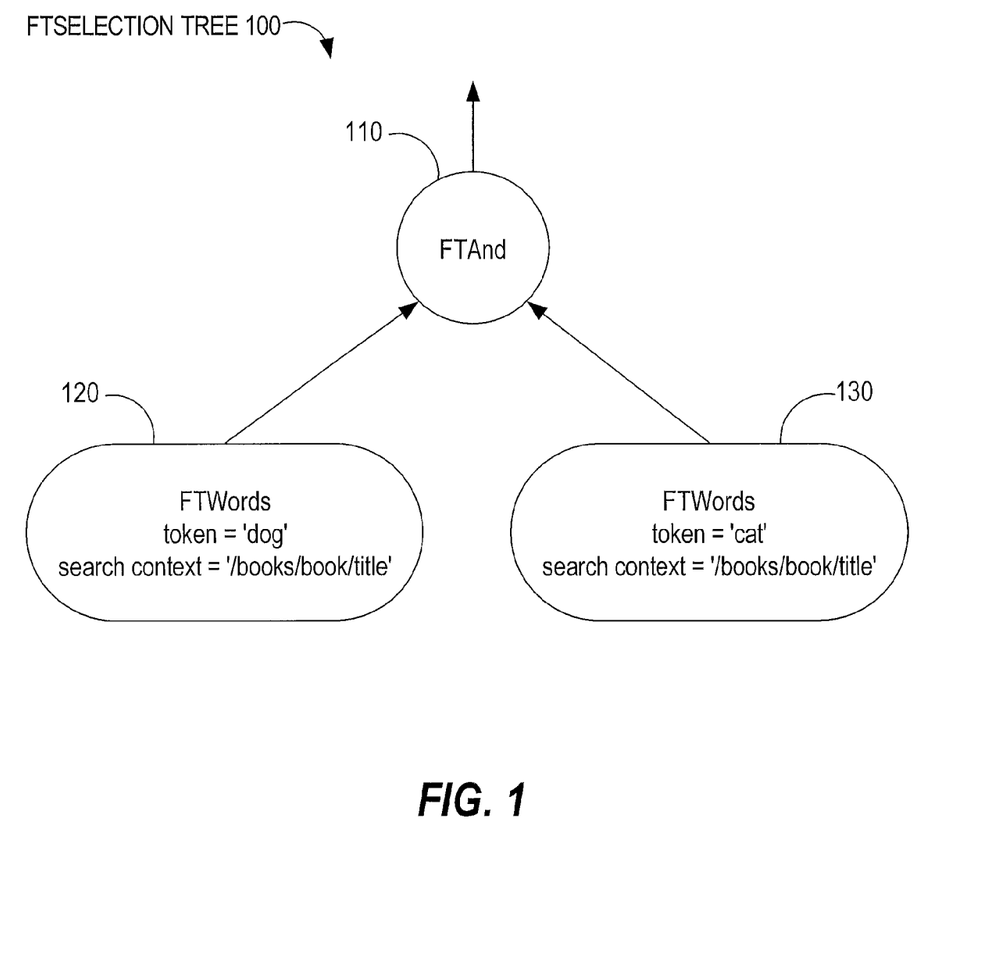
FIG. 1 is a diagram that depicts an FTSelection tree, according to an embodiment of the invention.

FIG. 1 is a diagram that depicts an FTSelection tree 100, according to an embodiment of the invention. FTSelection tree 100 may be based on the following XML FT query:

/books/book[title ftcontains 'dog' ftand 'cat']/author

FTSelection tree 100 comprises three nodes: an FTAnd node 110, an FTWords node 120, and an FTWords node 130. The arrow from FTWords node 120 to FTAnd node 110 and the arrow from FTWords node 130 to FTAnd node 110 indicate the flow of Match records "up" FTSelection tree 100. Under the eager evaluation model, FTWords 120 node would be evaluated, for each item in the search context, to generate all possible Match records, i.e., all instances of the token 'dog' would be located in the search context item and the location information of each instance would be stored in a different Match record. Those Match records would then be passed to FTAnd node 110. FTWords node 130 would be evaluated, for each item in the search context, to generate all possible Match records, i.e., all instances of the token 'cat' would be located in the search context item and the location information of each instance would be stored in a different Match record. Those Match records would then be passed to FTAnd node 110.

Under the iterator evaluation model, once a Match record is found for an instance of the token 'dog' in a search context item, the Match record is returned to FTAnd node 110. FTAnd node 110 then calls FTWords node 130, which "searches" for an instance of the token 'cat' in the same search context item. If there is a match, then the FTContains expression returns TRUE.

There are numerous benefits of the iterator evaluation model. For example, the iterator evaluation model allows the implementation to scale with a large number of Match records. Another benefit is that less memory is required because the full results of each operator may not be materialized. Another benefit of not materializing the full results of each operator is that less CPU is required, which corresponds to a reduction in the execution time of the query.

The iterator evaluation model works well for all FT operators except possibly the FTTimes operator. The semantics of the FTTimes operator requires forming multiple combinations of Match records from its input Match records. Although materializing the input Match records for FTTimes may be avoided, this would imply recomputation of the input Match records multiple times when forming combinations of Match records. Therefore, there is a tradeoff between memory space and CPU. Because recomputation of the input Match records tends to be more resource expensive relative to the allocation/deallocation of memory, all the input Match records to the FTTimes node may need to be materialized.

Efficient Allocation of the Execution State

In one approach for managing memory allocation during the execution of an FTSelection tree, memory is allocated for each Match (or StringMatch) record and de-allocated for that record after a node in the FTSelection tree evaluates the record. This approach is referred to as "dynamic memory allocation" where memory is allocated and de-allocated at run-time.

According to an embodiment of the invention, memory is allocated once before any nodes in an FTSelection tree are executed. The total size of the execution state of each node in an FTSelection tree may be (1) computed at compile time and (2) the memory for the FTSelection tree allocated once before the FTSelection tree is evaluated.

An FTSelection tree may be built during compile time and shared by all executing threads that execute the same FTContains expression. This means that the FTSelection tree does not internally store direct pointers to hold the computation state of each node in the FTSelection tree node. Instead, an offset may be stored in each node of the FTSelection tree. The offset is used to index into each thread's private execution state memory, which contains one or more Match (or String-Match) records.

Figure 2:
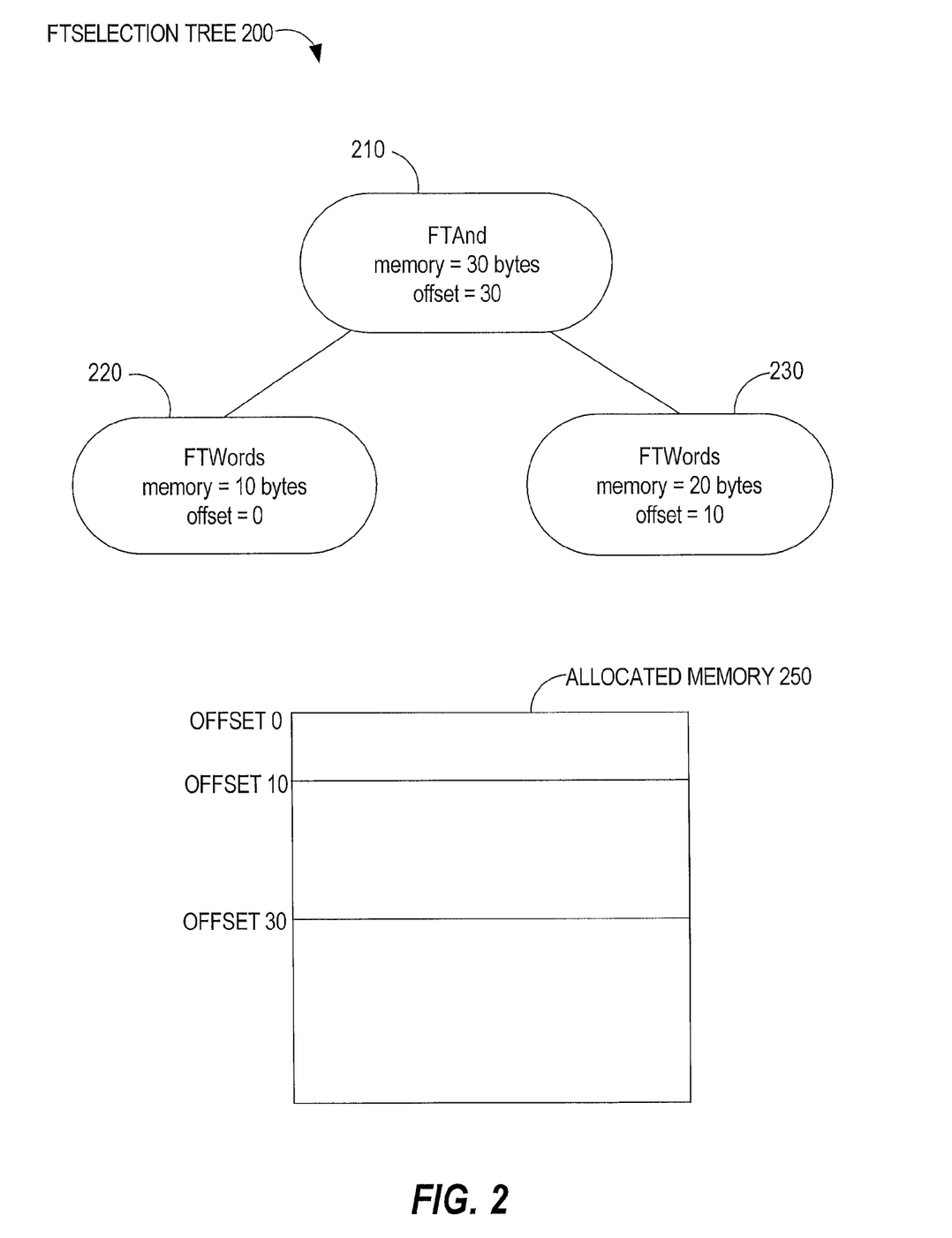
FIG. 2 is a diagram that depicts an example FTSelection tree and allocated memory, according to an embodiment of the invention.

FIG. 2 is a diagram that depicts an example FTSelection tree 200 and allocated memory 250, according to an embodiment of the invention. FTSelection tree 200 comprises an FTAnd node 210, an FTWords node 220, and an FTWords node 230. Each of nodes 210-230 contain information about how much memory is required to store the information required by the node and an offset used to locate the memory that stores the required information. In the depicted example, FTWords node 220 indicates that 10 bytes of memory are necessary to store a StringMatch record and that the StringMatch record is stored at offset 0 of allocated memory 250. FTWords node 230 indicates that 20 bytes of memory are necessary to store a StringMatch record and that the StringMatch record is stored at offset 10 of allocated memory 250. FTAnd node 210 indicates that 30 bytes of memory are necessary to store a StringMatch record and that the StringMatch record is stored at offset 30 of allocated memory 250. The memory required at an FTAnd node is the sum of the memory required for each child node of the FTAnd node. Thus, the memory required for FTAnd node 210 requires the sum of the memory required for FTWords nodes 220 and 230. For an FTOr node, the memory required at an FTOr node is the maximum of the memory required for any of its child nodes.

Examples of When the Size of the Execution State is not Computable at Compile Time The size of the execution state of a node in an FTSelection tree (and, consequently, the entire tree) may not determinable at compile time. For example, an XML FT query may include one or more bind variables in an FTSelection in place of one or more tokens. Without the knowledge of the actual token, the memory requirement for the execution state of a node, and thus for the entire FTSelection tree, cannot be known at compile time.

Another example involves FTWords that have an FTAnyallOption part of "all." An FTWords is a condition in an FTSelection that comprises one or more parts: (1) a mandatory FTWordsValue part and (2) an optional FTAnyallOption part. The FTWordsValue part specifies the tokens and/or phrases that must be contained in the matches. The FTAnyallOption part specifies how containment is checked. If FTAnyallOption is "all," then the sequence of tokens for each string is considered as a phrase. The resulting matches must contain all of the generated phrases. For example, //book[./title ftcontains {'Expert', 'Reviews'} all]

requires that a book have a title element that contains the token 'Expert' and the token 'Reviews.' The number of tokens to be searched in an FTWords condition with an FTAnyallOption part of "all" may not be known at compile time for at least two reasons. First, a bind variable may be used in place of the query tokens. Second, the FTSelection expression may be a complex XPath or XQuery query whose results are not known at compile time. As a result, the number of String-Match records in a Match record may not be computable during compilation of an XML FT query.

Another example of when the size of the execution state of a node in an FTSelection tree may not determinable at compile time is when the value of an FTTimes condition is not known at compile time. An FTTimes condition may not be known at compile time for at least the reasons given above for FTAnyallOption. Thus, a bind variable may be used in place of the FTTimes value and the "value" of FTTimes may be a complex XPath or XQuery query whose results are not known at compile time.

However, before execution of the FTSelection tree, the number of tokens to be searched in the FTWords node becomes known. With this knowledge, each processing thread (1) makes a copy of the compiled FTSelection tree, (2) modifies the FTSelection tree to convert any FTWords node with an "All" option into an FTAnd node with multiple child FTWords nodes, and (3) computes the size of the execution state of the FTSelection tree based on any additional FTAnd and FTWords nodes and the value of "times" in the FTTimes node. Step 3 involves computing the execution state of each node in the FTSelection tree that is an ancestor of one of these additional FTAnd and FTWords nodes and/or an FTTimes node.

The size of the execution state for an FTTimes node is proportional to the size of the largest combination that is returned by the FTTimes node. Apart from the execution state, each FTTimes node also has to store the materialized result of scanning its input operator.

Integration of Word and Phrase Search With Inverted Index List for XML Documents According to an embodiment of the invention, an index is used to evaluate an FTContains expression. One type of index that may be used is an inverted-list style text index. Such an index stores XML node identifiers so that the index can locate a word or phrase within a text document.

Additionally, the XQuery FT specification defines the semantics of sentences and paragraphs. A "sentence" is an ordered sequence of any number of tokens. Similarly, a "paragraph" is an ordered sequence of any number of tokens. The following example XML FT query includes a scope selection where the scope is 'paragraph':

//book[. ftcontains 'usability' ftand 'testing' same paragraph]

This example XML FT query returns a book element (if any) that contains 'usability' and 'testing' in the same paragraph. In order for an index to be useful for this type of query, the index entries for 'usability' and 'testing' should maintain location data that not only indicates the document in which the word is located, but also the paragraph and/or sentence in which the word is located.

Another type of information that index entries may include is the order key value of the node in which the word or phrase is found. The order key value of a node indicates the node's hierarchical position in the document that contains the node. The order key values may be used to determine ancestor/descendant relationships. For example, a first node with an order key value of 1.3.2 is a parent of a second node with an order key value of 1.3.2.4. As another example, a first node with an order key value of 2.3.5 is a sibling of a second node with an order key value of 2.3.3. As yet another example, a first node with an order key value of 4.1.2 is not a direct ancestor of a second node with an order key value of 4.2.4.3.

The evaluation of an FTWords operator pushes down the word or phrase search into an index, if one is available and applicable. Index entries may be fetched using an iterator evaluation approach so that all possible index entries are not materialized before evaluating the parent node of an FTWords node in the FTSelection tree.

In some instances, the search context of an FTContains expression is not indexed. In such instances, string value of a node N is evaluated, which evaluation requires going through all the descendant nodes of node N to arrive at the node's text. This evaluation may also employ an iterator evaluation approach, which avoids materializing the string value of the node. Avoiding the materialization of the string value of a node may be done by "remembering" (or storing) the last visited node in the state.

Group Evaluation of FTWords Nodes

An FTSelection tree may comprise multiple FTWords nodes, such as FTSelection tree 100. Generally, FTWords nodes are leaf nodes in an FTSelection tree. In one approach for evaluating such an FTSelection, a document is scanned to locate a token that matches the token associated with the left-most FTWords node in the FTSelection tree. Then, the same document is scanned to locate a token that matches the token associated with the second-to-left-most FTWords node in the FTSelection tree. The same document is scanned until the token that matches the token associated with the right-most FTWords node in the FTSelection tree is located. In the worst case scenario, the same document is scanned once for each FTWords node.

However, according to an embodiment of the invention, the computation of all the FTWords in an FTSelection tree is shared in one step. In other words, all the search tokens and/or phrases are packed together in one context and passed onto a single scan of the search context. Thus, each FTWords node in an FTSelection is evaluated before any parent node of any of the FTWords. A node is "evaluated" even if single result of the node is materialized. A node is "fully evaluated" if all possible results of the node are materialized. The worst case scenario of such an embodiment is a single scan of each document instead of multiple scans of each document.

For example, even if FTWords node 120 may be considered (a) the "first" FTWords node in FTSelection tree 100 or (b) to be "before" FTWords node 130 in FTSelection tree 100, the tokens 'dog' and 'cat' are searched at the same time. If the token 'cat' is discovered before the token 'dog,' then a StringMatch record is created for that occurrence of the 'cat' token. If a 'dog' token is then discovered, then a StringMatch record is created for that occurrence of the 'dog' token and FTAnd node 110 is then evaluated against those two StringMatch records.

However, if another 'cat' token is discovered before a 'dog' token is discovered, then another StringMatch record may be created for that occurrence of the 'cat' token and added to a linked list of StringMatch records for the 'cat' token. To account for such a linked list, memory may be allocated before execution of the FTSelection tree to store the linked list. For example, if 10 bytes are required to store a single StringMatch record for a particular token, 200 bytes may be allocated, before execution, to store up to 20 StringMatch records for the particular token. Then if more than 20 StringMatch records for the particular token need to be stored simultaneously, then additional memory is allocated as needed.

In an embodiment, each FTWords condition where the FTAnyallOption part is "all" is normalized into an FTAnd of multiple FTWords. Therefore, an FTAnd node may be the parent of three or more FTWords nodes.

Cost-Based Evaluation Strategies for FTContains Expression

As noted previously, an FTContains expression comprises a search context and an FTSelection. According to an embodiment of the invention, a particular evaluation strategy is selected from a plurality of evaluation strategies based on an estimated cost of each evaluation strategy. The particular evaluation strategy is used to evaluate the FTContains expression. The cost of each evaluation strategy depends on the actual search context and the actual FTSelection in the FTContains expression. Three evaluation strategies are described below using the following example FTContains expression:

$x/a/b ftcontains 'xquery'

A first evaluation strategy (referred to as "top-down evaluation") is to evaluate the search context to identify one or more search context items, such as XML nodes. For each search context item, the FTSelection is evaluated. In this example, $x/a/b may be evaluated to determine a sequence of element b nodes. Then, for each node, the FTSelection is evaluated in an iterative manner against each element b node. Alternatively, in response to identifying a single element b node, the FTSelection is evaluated against that element b node. Thus, not all element b nodes are identified before evaluating FTSelection.

If an index (e.g., an inverted index described above) indexes a word or phrase in the FTSelection, then one or more node identifiers are extracted from the index entries that contain that word or phrase. The one or more node identifiers are compared to the node identifiers determined from the search context item. Given the above example, an index is used to identify the node identifier of a text node that contains 'xquery.' If the node identifier of the text node and the node identifier of an element b node indicates that the text node is a child (or descendant) of the element b node, then a StringMatch is found. If the text node is not a descendant of the element b node, then a node identifier of another text node that contains 'xquery' is identified in the index and compared to the node identifier of the element b node.

If an index does not exist or does not index a word or phrase in the FTSelection, then, given the above example, for each element b node, the element b node is scanned to determine whether an element b node contains the word or phrase, similar to the iterative approach described above.

In an embodiment, an XML index is used to locate the nodes in one or more documents that correspond to a specified path (i.e., that corresponds to the search context) in the FTContains expression. One XML index that may be used is described in U.S. patent application Ser. No. 10/884,311, entitled "Index For Accessing XML Data", filed on Jul. 2, 2004, and which is incorporated by reference as if fully set forth herein. This XML index comprises a path table that stores one row for each indexed node of one or more XML documents. The path table row for a node includes (1) information for locating the XML document that contains the node, (2) information that identifies the path of the node, and (3) information that identifies the position of the node within the hierarchical structure of the XML document that contains the node. The information of (3) is referred to as the order key and may be used as a node identifier.

A second evaluation strategy (referred to as a "bottom-up evaluation") is to evaluate the FTSelection before evaluating the search context. In this example, 'xquery' is evaluated using an index (e.g., an inverted list text index) to identify one or more node identifiers of text nodes that contain 'xquery.' Then, for each node identifier, it is determined whether the corresponding the text node is on the $x/a/b$ path. This determination may be made in multiple ways.

For example, the path table described in "Index For Accessing XML Data" may be used to identify the node identifiers (or order key values) of a path that defines the search context. Given the above example, an index (e.g., an inverted list text index) is used to identify one or more node identifiers of text nodes that contain 'xquery.' The path table is then used to identify a node identifier of a node whose path is /a/b. If the node identifier of one of the text nodes and the node identifier of the node whose path is /a/b indicates that the text node is a child (or descendant) of the element b node, then a StringMatch is found. If the text node is not a descendant of the element b node, then a node identifier of another node whose path is /a/b is identified in the index and compared to the node identifier of the text node.

Another example of how it is determined whether a text node is on a given path is when no path index exists. An XML document may be stored as a DOM tree on disk. For each node identifier of a text node, the node identifier is used to traverse the DOM tree. If the text node is on the path specified in the search context, then a StringMatch is found. If the text node is not on the path specified in the search context, then a node identifier of another text node is used to traverse the DOM tree.

The third evaluation strategy is to create an FTContains-Join evaluation tree by evaluating the search context and the FTSelection separately and then joining the results. For example, evaluating $x/a/b$ identifies the node identifiers (e.g., order key values) of the element b nodes and evaluating the FTSelection identifies node identifiers (e.g., order key values) of the nodes associated with the resulting Match records. The join evaluation determines whether the node identifiers from the left side "covers" the node identifiers from the right side (i.e., if the identifier of the right node indicates that the right node is a child of the left node). The entire FTContains-join evaluation tree can be evaluated iteratively.

Selecting an Evaluation Strategy

The three evaluation strategies perform better or worse depending on cost. The first evaluation strategy is selected if the selectivity of the left side (i.e., the search context) of the FTContains expression is "low." Low selectivity of an expression indicates that a relatively low number of nodes in a search corpus satisfy the expression. Given the above example, if there are only a few nodes in the entire search corpus that satisfy the path $x/a/b$, then $x/a/b$ is said to have low selectivity.

The second evaluation strategy is selected if the selectivity of the FTSelection is low. Given the above example, if there are only a few nodes in the entire search corpus that include the token 'xquery,' then 'xquery' is said to have low selectivity.

In an embodiment, the third evaluation strategy is selected if neither the search context nor the FTSelection has low selectivity.

In order to determine selectivity of each side of an FTContains expression, statistics are collected and maintained that indicate the number of each node in a set of one or more nodes that are found in the search corpus. Statistics may also include the number of occurrences of certain words or phrases. These statistics are used to determine the selectivity of each side of an FTContains expression.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers represented on the persistent memory mechanism. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to a database language. One non-limiting database language supported by many database servers is SQL, including proprietary forms of SQL supported by such database servers as Oracle, (e.g., Oracle Database 10 g). SQL data definition language ("DDL") instructions are issued to a database server to create or configure database objects, such as tables, views, or complex data types.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. The client may use a variety of database applications that run on the database server, or the client may interact directly with the database server using the database language.

Resources from multiple nodes in a multi-node database system can be allocated to running a particular database server's software. Each combination of the software and allocation of the resources from a node is a server that is referred to herein as a "server instance" or "instance".

XML Storage

Various types of storage mechanisms are used to store a XML document. One type of storage mechanism stores a XML document as a text file in a file system. Another type of mechanism for storing XML documents is a database server. In a database server, a XML document may be stored in a row of a table and nodes of the XML document are stored in separate columns in the row. An entire XML document may also be stored in a lob (large object) in a column. A XML document may also be stored as a hierarchy of objects in a database; each object is an instance of an object class and stores one or more elements of a XML document. Tables and/or objects of a database system that hold XML data are referred to herein as base tables or objects.

Database servers may include many mechanisms that allow for powerful and efficient ways to query large collections of XML documents. Database servers that store XML documents may be enhanced to efficiently perform XML operations using these mechanisms. One such type of XML operation is to execute queries over collections of XML documents using XML query languages, such as XQuery and XPath. XQuery and XPath can be used in conjunction with SQL to express a large variety of useful queries. The term XML query is used to refer to queries that conform to (1) XQuery, XPath, and/or another XML language standard, (2) SQL queries that may embed XQuery or XPath expressions, or (3) proprietary dialects of XQuery, XPath, SQL, or XML standard languages.

When a database server receives an XML query, the database server may rewrite the query to refer to the underlying database structures that store the XML data. Such rewrites may include rewriting the query to refer to the data structures (e.g. a path table of an XML index).

Hardware Overview

Figure 3:
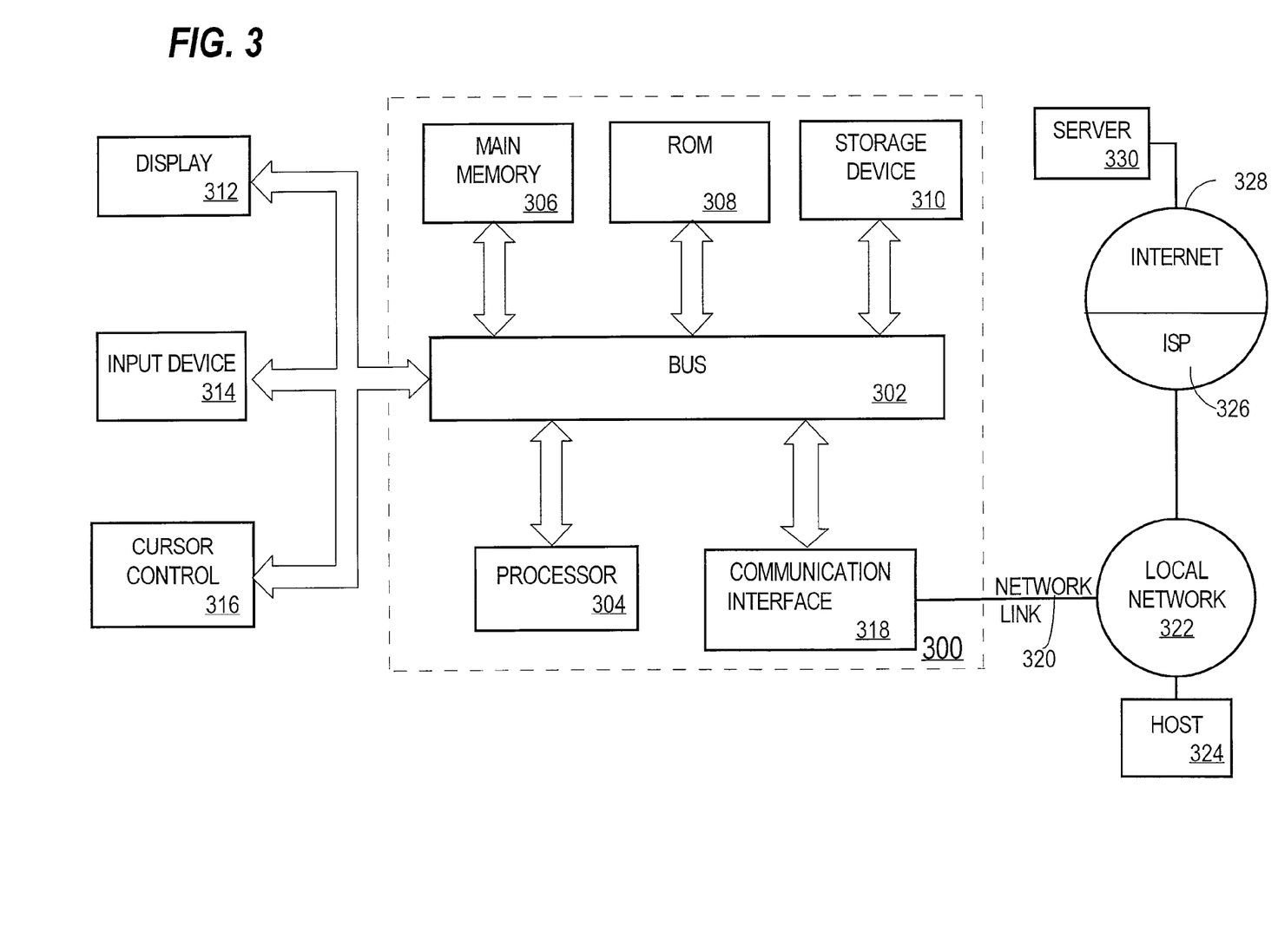
FIG. 3 is a block diagram of a computer-system that may be used in an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving an XML query that conforms to an XML-based query language that includes full-text search capabilities;
    compiling the XML query to generate a tree that comprises a plurality of nodes, wherein each node in the plurality of nodes corresponds to a full-text operator;
    before evaluating any of the nodes in the tree:
        determining a size of the execution state for each node of the plurality of nodes; and
        allocating, based at least in part on the size of the execution state for each node of the plurality of nodes, a portion of memory for said each node; and
    fully evaluating the tree to determine a final result without de-allocating or allocating memory for each node of the plurality of nodes;
    wherein the method is performed by one or more computing devices.

2. The method of claim 1, wherein the step of determining is performed during the step of compiling the XML query.

3. The method of claim 1, wherein the XML query includes a bind variable, wherein the value of the bind variable is not known during the step of compiling the XML query, the method further comprises the steps of:
    after compiling the XML query, determining the value of the bind variable; and
    determining the size of one or more nodes of the plurality of nodes based, at least in part, on the value of the bind variable.

4. The method of claim 1, further comprising the steps of:
    determining that the XML query specifies an 'all' option that indicates that all words or phrases in a full-text portion of the XML query must be contained in an item in a search context that is specified in the XML query;
    in response to determining that the XML query specifies the 'all' option, generating a full-text operator that combines two or more full-text selections.

5. The method of claim 1, further comprising the step of:
    determining that the XML query specifies a number of times that a word or phrase in a full-text portion of the XML query must be contained in an item in a search context that is specified in the XML query;
    wherein allocating the portion of memory for each node is based, at least in part, on the number.

6. A method comprising:
    receiving an XML query that specifies a search context and a full-text selection expression;
    compiling the XML query to generate a tree that comprises a plurality of nodes that includes one or more leaf nodes, wherein each node in the plurality of nodes corresponds to a full-text operator, wherein each of the one or more leaf nodes corresponds to a different word or phrase in the full-text selection expression;
    while evaluating the tree:
        evaluating a particular leaf node of the one or more leaf nodes before evaluating a parent node of the particular leaf node;
        after identifying, in the search context, at least one occurrence of a word or phrase that corresponds to the particular leaf node and without identifying all occurrences of the word or phrase in the search context, evaluating a parent node of the one or more leaf nodes;
    wherein the method is performed by one or more computing devices.

7. The method of claim 6, wherein:
- evaluating each of the plurality of leaf nodes includes identifying a plurality of occurrences of a particular word or phrase in the full-text selection expression before identifying any occurrence of another word or phrase in the full-text selection expression; and
- storing information about each occurrence of the plurality of occurrences of the particular word or phrase in association with the leaf node that corresponds to the particular word or phrase.

8. The method of claim 7, further comprising before evaluating any of the plurality of leaf nodes, allocating an amount of memory that is large enough to store information about a particular number of occurrences of the particular word.

9. A method comprising:
- receiving an XML query that specifies a search context and a full-text selection expression;
- determining a first selectivity of the search context;
- determining a second selectivity of the full-text selection expression;
- determining, based at least in part on the first selectivity and the second selectivity, a particular evaluation strategy from a plurality of evaluation strategies; and
- executing the XML query based, at least in part, on the particular evaluation strategy;
- wherein the method is performed by one or more computing devices.

10. The method of claim 9, wherein:
- the first selectivity of the search context is lower than the second selectivity of the full-text selection expression; and
- the particular evaluation strategy comprises:
  - evaluating the search context to determine a first set of one or more nodes, and
  - for each node of the first set of nodes, evaluating the full-text selection expression.

11. The method of claim 9, wherein:
- the second selectivity of the full-text selection expression is lower than the first selectivity of the search context; and
- the particular evaluation strategy comprises:
  - evaluating the full-text selection expression to determine a first set of one or more nodes, and
  - for each node in the first set of nodes, evaluating the search context.

12. The method of claim 9, wherein the particular evaluation strategy comprises:
- evaluating the search context to determine a first set of nodes,
- evaluating the full-text selection expression to determine a second set of nodes, and
- determining whether a node in the second set of nodes is a descendant node of a node in the first set of nodes.

13. One or more non-transitory storage media storing instructions which, when executed by one or more processors, cause:
- receiving an XML query that conforms to an XML-based query language that includes full-text search capabilities;
- compiling the XML query to generate a tree that comprises a plurality of nodes, wherein each node in the plurality of nodes corresponds to a full-text operator;
- before evaluating any of the nodes in the tree:
  - determining a size of the execution state for each node of the plurality of nodes; and
  - allocating, based at least in part on the size of the execution state for each node of the plurality of nodes, a portion of memory for said each node; and
- fully evaluating the tree to determine a final result without de-allocating or allocating memory for each node of the plurality of nodes.

14. The one or more storage media of claim 13, wherein the step of determining is performed during the step of compiling the XML query.

15. The one or more storage media of claim 13, wherein:
- the XML query includes a bind variable;
- the value of the bind variable is not known during the step of compiling the XML query; and
- the instructions, when executed by the one or more processors, further cause:
  - after compiling the XML query, determining the value of the bind variable; and
  - determining the size of one or more nodes of the plurality of nodes based, at least in part, on the value of the bind variable.

16. The one or more storage media of claim 13, wherein the instructions, when executed by the one or more processors, further cause:
- determining that the XML query specifies an 'all' option that indicates that all words or phrases in a full-text portion of the XML query must be contained in an item in a search context that is specified in the XML query;
- in response to determining that the XML query specifies the 'all' option, generating a full-text operator that combines two or more full-text selections.

17. The one or more storage media of claim 13, wherein the instructions, when executed by the one or more processors, further cause:
- determining that the XML query specifies a number of times that a word or phrase in a full-text portion of the XML query must be contained in an item in a search context that is specified in the XML query;
- wherein allocating the portion of memory for each node is based, at least in part, on the number.

18. One or more non-transitory storage media storing instructions which, when executed by one or more processors, cause:
- receiving an XML query that specifies a search context and a full-text selection expression;
- compiling the XML query to generate a tree that comprises a plurality of nodes that includes one or more leaf nodes, wherein each node in the plurality of nodes corresponds to a full-text operator, wherein each of the one or more leaf nodes corresponds to a different word or phrase in the full-text selection expression;
- while evaluating the tree:
  - evaluating a particular leaf node of the one or more leaf nodes before evaluating a parent node of the particular leaf node;
  - after identifying, in the search context, at least one occurrence of a word or phrase that corresponds to the particular leaf node and without identifying all occurrences of the word or phrase in the search context, evaluating a parent node of the one or more leaf nodes.

19. The one or more storage media of claim 18, wherein:
- evaluating each of the plurality of leaf nodes includes identifying a plurality of occurrences of a particular word or phrase in the full-text selection expression before identifying any occurrence of another word or phrase in the full-text selection expression; and storing information about each occurrence of the plurality of occurrences of the particular word or phrase in association with the leaf node that corresponds to the particular word or phrase.

20. The one or more storage media of claim 19, wherein the instructions, when executed by the one or more processors, further cause, before evaluating any of the plurality of leaf nodes, allocating an amount of memory that is large enough to store information about a particular number of occurrences of the particular word.

21. One or more non-transitory storage media storing instructions which, when executed by one or more processors, cause:
   receiving an XML query that specifies a search context and a full-text selection expression;
   determining a first selectivity of the search context;
   determining a second selectivity of the full-text selection expression;
   determining, based at least in part on the first selectivity and the second selectivity, a particular evaluation strategy from a plurality of evaluation strategies; and
   executing the XML query based, at least in part, on the particular evaluation strategy.

22. The one or more storage media of claim 21, wherein:
   the first electivity of the search context is lower than the second selectivity of the full-text selection expression; and
   the particular evaluation strategy comprises:
      evaluating the search context to determine a first set of one or more nodes, and
      for each node of the first set of nodes, evaluating the full-text selection expression.

23. The one or more storage media of claim 21, wherein:
   the second selectivity of the full-text selection expression is lower than the first selectivity of the search context; and
   the particular evaluation strategy comprises:
      evaluating the full-text selection expression to determine a first set of one or more nodes, and
      for each node in the first set of nodes, evaluating the search context.

24. The one or more storage media of claim 21, wherein the particular evaluation strategy comprises:
   evaluating the search context to determine a first set of nodes,
   evaluating the full-text selection expression to determine a second set of nodes, and determining whether a node in the second set of nodes is a descendant node of a node in the first set of nodes.

* * * * *

UNITED STATES PATENT AND TRADEMARK OFFICE
CERTIFICATE OF CORRECTION

PATENT NO. : 8,312,030 B2
APPLICATION NO. : 12/388249
DATED : November 13, 2012
INVENTOR(S) : Liu et al.

Page 1 of 1

It is certified that error appears in the above-identified patent and that said Letters Patent is hereby corrected as shown below:

In column 4, line 11, delete "Cartesian" and insert -- cartesian --, therefor.

In column 17, line 24, in Claim 22, delete "electivity" and insert -- selectivity --, therefor.

Signed and Sealed this
Fifth Day of February, 2013

Teresa Stanek Rea
*Acting Director of the United States Patent and Trademark Office*